Patented Oct. 10, 1922.

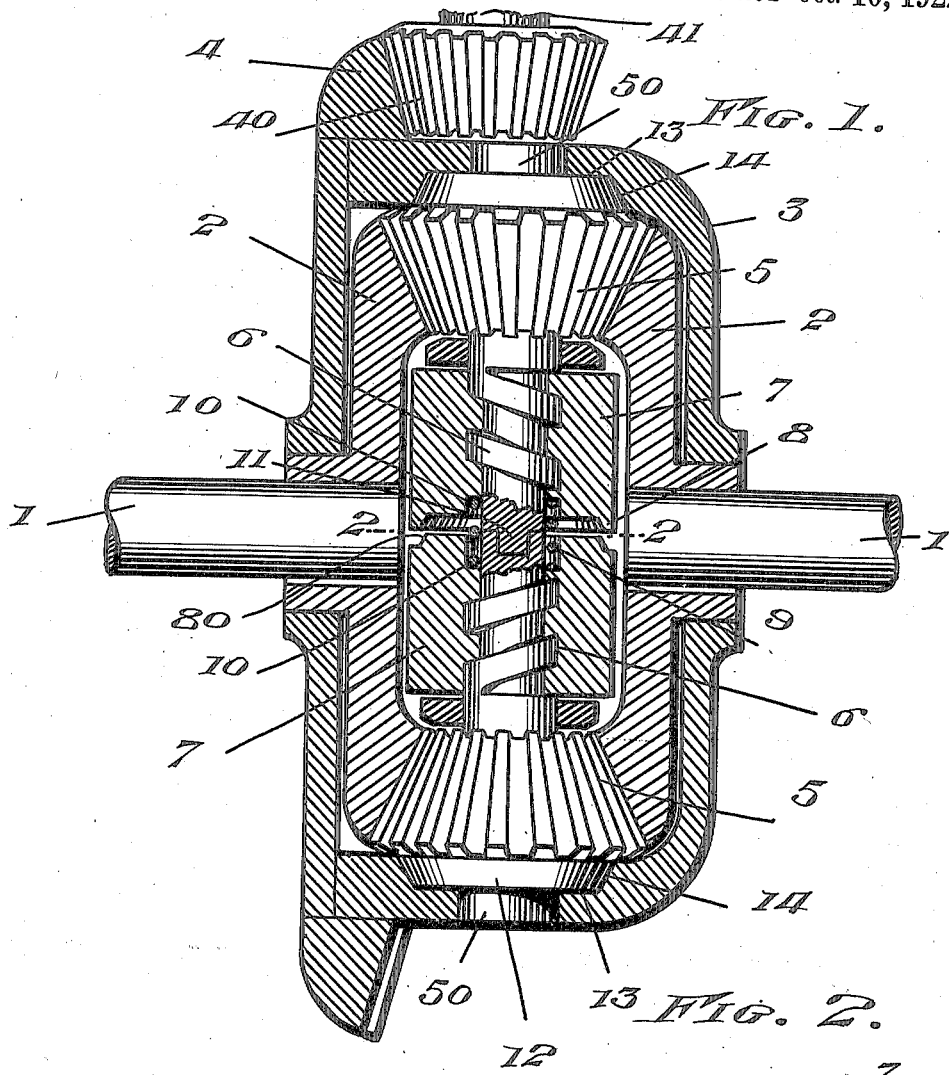
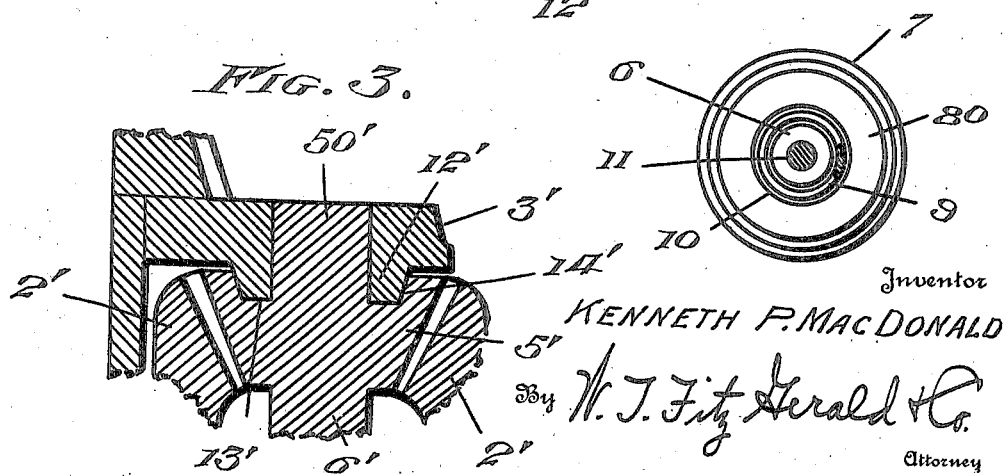

1,431,535

UNITED STATES PATENT OFFICE.

KENNETH P. MacDONALD, OF LEGASPI, PHILIPPINE ISLANDS.

AUTOMATIC SELF-LOCKING DIFFERENTIAL GEARING.

Application filed July 7, 1921. Serial No. 483,030.

*To all whom it may concern:*

Be it known that I, KENNETH P. MAC-DONALD, a citizen of the United States, residing at Legaspi, in the Province of Albáy, Philippine Islands, have invented certain new and useful Improvements in Automatic Self-Locking Differential Gearing; and I do hereby declare the following to be a full, clear, and exact description of the invention, such as will enable others skilled in the art to which it appertains to make and use the same.

The present invention relates generally to differential gearing such as used in automobiles and other machines for driving two propelling wheels or other driven elements from a common driving shaft or member, and this invention is particularly an improvement over the automatic self-locking differential gearing disclosed in my Patent No. 1,341,276, granted May 25, 1920.

It is the object of the present invention to provide a differential gearing provided with means for frictionally resisting the spinning of either driven shaft or member should same become freed, thereby tending to rotate both driven shafts or members with the same speed and power.

A further object is the provision of such improvements in differential gearing, which will be extremely simple and inexpensive in construction, as well as efficient and practical in operation.

With the foregoing and other objects in view, which will be apparent as the description proceeds, the invention resides in the construction and arrangement of parts hereinafter described and claimed, it being understood that changes can be made within the scope of what is claimed without departing from the spirit of the invention.

The invention is illustrated in the accompanying drawing, wherein:—

Figure 1 is a diametrical section of a differential gearing showing the improvements embodied therein, portions being shown in elevation;

Fig. 2 is a section on the line 2—2 of Fig. 1;

Fig. 3 is a sectional detail showing a modification;

The improvements are illustrated as embodied in a simple form of differential gearing, including the axle sections or driven shafts or members 1 on the adjacent ends of which are keyed the gear wheels 2. A rotatable member 3 enclosing said gear wheels is mounted for rotation on the hubs thereof, and has a gear 4 meshing with a pinion 40 on the driving shaft 41, the member 3 constituting the driving member of the gearing and carrying two or more planetary pinions 5 between and meshing with the opposite gear wheels 2, thus distributing the power from the driving member to the driven members or shafts 1 with a differential and compensating action, as well known.

In order to lock the driven members 1 together when there is a tendency for either of them to spin or rotate at a relatively higher speed than normally required in turning corners or the like, the two diametrically opposite pinions have inwardly extending screws or threaded spindles 6 projecting toward one another and preferably having their adjacent ends provided with a swivel connection, such as by means of a pivot plug 11 on the end of the one screw 6 fitting within a recess in the end of the other screw. One of the screws is right handed, and the other left handed, and on each of said screws is threadedly mounted a clutch member or nut 7 adapted to turn freely on the screw, and of sufficient weight or bulk so that the momentum will tend to prevent said members 7 from turning with the corresponding screws should said screws spin suddenly. The adjacent ends of the members 7 are provided with clutch portions for frictional engagement with one another, whereby said members will grip one another. Thus, as shown, the corresponding end of one member 7 has a recess 8, and the confronting end of the other member 7 has a boss 80, and the walls or peripheries of said recess and boss are beveled or conical to provide a friction "cone" clutch, whereby said members will frictionally grip one another when moved together. Said members are normally separated by a light coiled wire expension spring 9 surrounding the screws 6 and confined between said members, the adjacent ends of which have recesses 10 receiving said spring. This spring 9 is of sufficient tension to hold the clutch members apart during normal operation, preventing either clutch member from being moved inwardly by screw action due to the rotation of the pinions 5, unless there is a sudden abnormal increase in the speed of such pinions.

The structure already described, is substantially the same as disclosed in said patent, with the exception of the friction between the clutch members 7, the advantages of which will be brought out hereinafter.

Friction clutches or gripping means between the member 3 and pinions 5 are also provided, to assist in the prevention of the spinning of either driven member 1. Thus, said pinions 5 have studs 50 journaled for rotation in the member 3, as usual, and the backs or larger diametered sides of the pinions 5, which are disposed outwardly away from the center of the gearing, are provided with bosses 12, and the member 3 is provided on the inner periphery thereof with recesses 13 snugly receiving said bosses. The walls or peripheries of said bosses and recesses are beveled or conical, as at 14, whereby to provide friction "cone" clutches between said pinions and member 3. Thus, when there is a considerable outward pressure on the pinions 5, the bosses 12 thereof will tend to bind frictionally within the recesses 13, to grip the member 3, and thereby resist the rotation of the pinions 5 about their axes.

In operation, the member 3 is rotated and carries the pinions 5 around with it to rotate the gear wheels 2 and shafts or members 1 with the member 3. Either shaft or member 1 may rotate faster than the other, in which event, the pinions 5 will have a rotary motion about their axes, as well known. When the gear wheels 2 rotate relatively to one another, thereby rotating the pinions 5 between them with a rolling motion, due to the fact that the gear wheels 2 and pinions 5 are beveled, the pinions 5 are given an outward thrust toward the member 3. This is ordinarily overcome by anti-friction means between the pinions 5 and member 3, but in the present case, a friction grip or clutch is especially provided between the pinions 5 and members 3. Such frictional engagement of the pinions 5 and member 3, will not appreciably interfere with the slight rotation of the pinions 5, such as when the differential gearing is used on a motor vehicle and the vehicle is making a turn. However, should one of the shafts or members 1 become freed, so that it could have a tendency to spin or rotate at a high speed, the outward thrust against the pinions 5 is increased considerably, thereby causing the bosses 12 to bind or grip within the recesses 13, and resisting the rotation of the pinions with considerable effort, to avoid the spinning of the freed driven shaft or member. This resistance to the spinning of either shaft or member 1 is augmented or increased by the action of the members 7. Ordinarily, the members 7 rotate with the pinions 5 and their screws 6, and the spring 9 holds said clutch members apart against any tendency for them to travel inwardly on the screws, even when the gear wheels 2 and members 1 rotate relatively at a normal speed. Should there be an abnormal increase in speed of either driven member or shaft 1, this will increase the speed of rotation of the pinions 5 about their axes, and the sudden increase in rotational speed of the screws will cause the corresponding clutch member 7 to move inwardly into engagement with the opposite clutch member. The clutch members therefore frictionally grip one another, and thereby tend to resist the rotation of the pinions in opposite directions, which will have a tendency to lock the gear wheels 2 and members 1 together for simultaneous rotation, assisted by the frictional engagement of the pinions 5 with the member 3. In view of the fact that one screw 6 is right-handed, and the other left handed, one of the clutch members will be forced inwardly should the pinions 5 rotate at an abnormal speed in either direction, due to the spinning of one member 1 or the other, and such action will occur during the rotation of the members 1 in either direction, as when moving forwardly or rearwardly. The reverse screws provide for the frictional locking of the gearing by the rotation of either member at a high speed compared with the other, and in either direction of rotation. When both members 1 rotate at about the same speed, the pinions 5 travel around with the member 3 and wheels 2, but inasmuch as the gear wheels 2 do not have much relatively rotational speed, the pinions 5 have only slight rotation about their axes, if any. However, should one of the members 1 be freed or released, the pinions 5 will at once tend to rotate said member 1 at a high or abnormal speed. When this occurs, the sudden increase in speed of the pinions 5 and their screws 6, will cause the corresponding clutch member 7 to be forced inwardly by the active screw 6, the momentum of such clutch member preventing it from turning suddenly with the screw, so that said screw turns within the clutch member and forces it inwardly into engagement with the opposite clutch member against the tension of the spring 9. The frictional engagement of the clutch members will frictionally lock the pinions 5 together, thereby similarly locking the gear wheels 2 and members 1 together assisted by the friction between the pinions 5 and member 3. Thus, the friction between the pinions 5 and member 3 is increased due to the fact that when the clutch member 7 that is moved inwardly contacts with the other clutch member, there is a tendency for the screws 6 to be separated, thereby creating an additional outward thrust on the pinions. Therefore, in view of the friction provided between the pinions 5 and member 3 and between the clutch member 7, at three points, the spinning or free rotation of either member 1 is avoided. This condition will be maintained as long as there is a tendency for either member 1 to spin with respect to the other, but as soon as the tendency for the members 1 to spin relatively has passed, the spring 9 will come into play and separate the clutch members, thereby releasing the driven members 1 for normal operation. Centrifugal force will also assist the spring 9 in moving the clutch members outwardly to normal position away from one another, especially when the driving member 3 is rotated at a high speed, the spring being used to assure of such return of the clutch members under all conditions. Moreover, the spring 9 and centrifugal action of the clutch members 7 and pinions 5 will increase the friction of the pinions 5 against the member 3, but such friction is not objectionable for the normal slow rotation of the pinions if necessary, although it does hinder the high speed of rotation of the pinions about their axes, which is intentional with the present improvements, to prevent the spinning of either driven member when freed.

As a result of using the present construction, the gearing will operate as usual under normal conditions, and the driven members will be frictionally locked together whenever and as long as there is tendency for either driven member to spin or rotate at an abnormal speed with respect to the other, so that both driven members will be operated substantially as a unit from the driving member and said driven members will be automatically unlocked or released from one another when normal conditions are restored. By using the frictional engagement between the pinions 5 and member 3, and between the clutch members 7, a substantially rigid lock is provided between the driven members when there is a tendency for either of them to spin, and such frictional engagement will permit of the gradual gripping of the parts, which is not possible with a toothed or positive clutch connection. The clutching engagement is also distributed between several parts, to relieve them of undue strain, and avoid the concentration of the strain and the possible weakening or fracture of any of the parts. The frictional engagement results in the locking action being brought about gradually, to avoid a sudden shock or jar which would result if the spinning driven member were abruptly locked to the stationary or slowly rotating driven member.

The friction clutch engagement can be provided between all of the pinions 5 and the member 3, if more than two pinions 5 are used, even though all of the pinions cannot have the screws 6 and clutch members 7. The clutch portions can also be faced with frictional material or surfaces to make the frictional grip more positive.

A modified form is shown in Fig. 3 wherein the boss and recess between the member 3' and pinion 5' are reversed. Thus, the member 3' has a boss 12' on its inner periphery surrounding the stud 50' of the pinion 5', and the outer side of the pinion has a recess 13' receiving said boss, and the peripheries of said boss and recess are beveled or conical, as at 14', whereby the outward pressure on the pinions 5' will cause it to frictionally grip on the boss 12'. The pinion 5' engages the gear wheels 2', and has the screw 6' the same as in the form hereinbefore described, and the action and operation is substantially the same.

Having thus described the invention, what is claimed as new is:—

1. Differential gearing including a pair of gear wheels, a rotary member, a pinion carried by said member and meshing with said gear wheels, said pinion and member having a friction clutch between them to resist the high speed of rotation of said pinion, and means to assist in the outward thrust of said pinion against said member.

2. Differential gearing including a pair of gear wheels, a rotary member, opposite pinions meshing with said gear wheels and movable with said member, said pinions and member having friction clutches between them, said pinions having opposite screws extending toward one another, and clutch members threaded on said screws to be moved together by the excessive speed of rotation of the pinions, said clutch members having clutch means to frictionally engage one another.

3. Differential gearing according to claim 2 and also including an expansion spring between said clutch members for separating them and moving the pinions outwardly against said member.

4. Differential gearing including a pair of gear wheels, a rotary member, a pinion carried by said member and meshing with said gear wheels, said pinion and member having a friction clutch between them to resist the high speed of rotation of said pinion, a screw-threaded portion rotatable with said pinion, and means engaging said screw-threaded portion to normally rotate with the pinion and to be moved by said portion when the pinion rotates at an excessive speed for obtaining a thrust on the pinion against said member.

In testimony whereof I have signed my name to this specification in the presence of two subscribing witnesses.

KENNETH P. MacDONALD.

Witnesses:
I. M. TARROBAGO,
LUIS ORTEZA.